US008955755B2

(12) United States Patent
Heusmann et al.

(10) Patent No.: US 8,955,755 B2
(45) Date of Patent: Feb. 17, 2015

(54) DATA CARRIER CONFIGURATION (75) Inventors: Hans Heusmann, Egenhofen (DE); Albert Ojster, Gruenwald (DE)

(73) Assignee: Giesecke & Devrient America, Inc., Dulles, VA (US)

( * ) Notice: Subject to any disclaimer, the term of this patent is extended or adjusted under 35 U.S.C. 154(b) by 518 days.

(21) Appl. No.: 12/923,392

(22) Filed: Sep. 17, 2010

(65) Prior Publication Data

US 2011/0062243 A1    Mar. 17, 2011

(30) Foreign Application Priority Data

Jan. 27, 2009 (DE) .......... 10 2009 006 341

(51) Int. Cl.
*G06K 19/06* (2006.01)
*G06K 13/08* (2006.01)
*G06K 7/00* (2006.01)
*G06K 19/00* (2006.01)
*G06K 19/077* (2006.01)

(52) U.S. Cl.
CPC ........ *G06K 19/077* (2013.01); *G06K 19/07722* (2013.01); *G06K 19/07739* (2013.01); *G06K 19/0776* (2013.01)
USPC ............ 235/492; 235/380; 235/486; 235/487

(58) Field of Classification Search
CPC ......... G07F 7/1008; G07F 7/02; G07F 7/086; G07F 7/0866; G06Q 20/341; G06Q 20/343; G06Q 20/3578; G06Q 20/32; G06Q 20/354; G06K 19/077; G06K 13/08; G06K 19/005; G06K 19/07732; G06K 19/07741; G06K 13/085; G06K 19/072; G06K 19/07749; G06K 19/07733; G06K 7/006; G06K 13/0806; G06K 13/0875; G06K 19/07724; G06K 7/0021; G06K 19/07739; G06K 19/07745; G06K 7/0013; G06K 19/07743; G06K 7/0043; G06K 19/044; G06K 19/06187; G06K 19/06206; G06K 19/07716; G06K 2017/0067; H01L 23/49855; H01L 23/538
USPC .................. 235/492, 380, 486, 487
See application file for complete search history.

(56) References Cited

U.S. PATENT DOCUMENTS 5,251,937 A    10/1993 Ojster
5,458,713 A    10/1995 Ojster
(Continued)

FOREIGN PATENT DOCUMENTS

DE    19921525 A1    11/2000
DE    19921525 C1    11/2000
(Continued)

OTHER PUBLICATIONS

WIPO/PCT International Search Report mailed Apr. 28, 2010, International Application No. PCT/EP2010/050836.

*Primary Examiner* — Thien T Mai
(74) *Attorney, Agent, or Firm* — Baker Botts L.L.P.

(57) ABSTRACT

A data carrier configuration method and apparatus are disclosed. The data carrier configuration including an electronic data carrier and a transport carrier. The transport carrier has a top surface and forms a recess, the area of the recess having an opening of a length and width sized to accommodate passage of the electronic data carrier. The recess has a depth that is substantially similar to the thickness of the electronic data carrier. The transport carrier serves as a base upon which the electronic data carrier will releasably attach.

19 Claims, 3 Drawing Sheets

(56) References Cited

U.S. PATENT DOCUMENTS

| | | | |
|---|---|---|---|
| 5,677,524 A * | 10/1997 | Haghiri-Tehrani | 235/492 |
| 5,851,854 A | 12/1998 | Haghiri-Tehrani et al. | |
| 5,888,624 A | 3/1999 | Haghiri et al. | |
| 6,320,751 B2 * | 11/2001 | Takeda et al. | 235/492 |
| 7,549,244 B2 | 6/2009 | Nelms et al. | |
| 8,107,246 B2 * | 1/2012 | Fidalgo et al. | 235/492 |
| 2008/0059369 A1 | 3/2008 | Nelms et al. | |
| 2009/0108060 A1 * | 4/2009 | Phillips et al. | 235/380 |

FOREIGN PATENT DOCUMENTS

| | | |
|---|---|---|
| EP | 1117063 A1 | 7/2001 |
| FR | 2 853 434 | 10/2004 |
| WO | WO 02/35467 A1 | 5/2002 |
| WO | WO 2006122882 A1 * | 11/2006 |

* cited by examiner

DATA CARRIER CONFIGURATION

CROSS-REFERENCE TO RELATED APPLICATION

This application claims the benefit of U.S. Provisional Application No. 61/272,381, filed Sep. 17, 2009, which claims benefit and priority under 35 USC 119 to German patent application number 102009006341.2, filed Jan. 27, 2009, in the German Patent Office, each of which is hereby incorporated by reference in their entirety.

BACKGROUND

1. Field of the Invention

The present invention relates generally to data carriers. More particularly, the present invention relates to a data carrier configuration comprising a transport carrier.

2. Description of the Related Art

With the expansion of the modern information society, non-cash forms of payment are becoming the dominant vehicle of financial transactions. Typical non-cash forms of payment include automated transfers from bank accounts, transaction cards, such as credit cards, debit cards, and pre-paid cards, etc. Transaction cards themselves have seen, over time, an increase in technological sophistication, evolving from magnetic stripe cards to cards having embedded integrated circuits, to cards having embedded antennas and integrated circuits with radio frequency identification (RFID) capabilities for contactless applications. With the change in card technology, opportunities for different configuration and packaging of data carriers are available. Accordingly, what is needed is a data carrier configuration for supporting states of non-cash transaction technology.

SUMMARY

The present invention has been developed to address the above and other problems in the related art. According to exemplary embodiments of the present invention, a data carrier configuration is disclosed. The data carrier configuration includes a transport carrier having a recess formed therein. Exemplary embodiments provide for the recess to comprise an aperture opening, alternate embodiments provide for the recess to be open toward the top side of the transport carrier but closed to the bottom side. Exemplary embodiments provide for the data carrier configuration to further include an electronic data carrier to be removably mounted in the recess. The electronic data carrier includes, amongst other things, an integrated circuit and an ability to fasten to an object. In exemplary embodiments the surface of the electronic data carrier, when installed in the transport carrier, aligns with the surface of the transport carrier within a dimensional tolerance. Exemplary embodiments provide for the electronic data carrier to be flexible, and exemplary embodiments provide for the electronic data carrier to comprise an adhesive layer.

According to exemplary embodiments of the present invention, the electronic data carrier comprises an adhesive layer and is removably coupled to the base of the recess in the transport carrier. Exemplary embodiments provide for the adhesive layer to be covered by a removable protective layer. Alternate embodiments provide for the base of the recess to comprise an adhesive and the electronic data carrier having the removable protective layer removably coupled thereon. Exemplary embodiments provide for the adhesion between the protective layer, the base of the recess, and the electronic data carrier to vary. In one embodiment, the adhesion between the protective layer and the base of the recess is less than the adhesion between the protective layer and the adhesive layer of the electronic data carrier. In another embodiment, the adhesion between the protective layer and the base of the recess is greater than the adhesion between the protective layer and the adhesive layer of the electronic data carrier.

According to exemplary embodiments of the present invention, the base of the recess is formed by the surface of an underlay, which is fastened on the rear of the transport carrier. Exemplary embodiments provide for a cover to be applied above the recess. Exemplary embodiments provide for a grip indentation to be formed on the margin the recess. Exemplary embodiments provide for the electronic data carrier to comprise an antenna and a ferrite layer that is situated between the antenna and the adhesive layer. Exemplary embodiments provide for the electronic data carrier to comprise at least one layer made of flexible plastic.

According to exemplary embodiments of the present invention, a method of producing a data carrier configuration is disclosed, wherein the data carrier configuration comprises a transport carrier having a recess and an electronic data carrier that is removably mounted in the recess. Exemplary embodiments provide for the recess to comprise an aperture opening. The electronic data carrier has an integrated circuit and an ability to fasten to an object. The method includes providing a transport carrier, forming a recess in the transport carrier, and providing a flexibly implemented electronic data carrier. Exemplary embodiments provide for coupling the electronic data carrier to a flexible underlay to facilitate application to the transport carrier. Exemplary embodiments provide for unrolling the underlay over the recess in the transport carrier so that the electronic data carrier is mounted therein. In exemplary embodiments the underlay adheres to the transport carrier and forms the base of the recess. Additional method steps provide for the underlay and electronic data carrier to be associated with a windable transport film and transferred therefrom by unrolling onto the transport carrier.

According to exemplary embodiments of the present invention, a method of producing a data carrier configuration is disclosed, wherein the data carrier configuration comprises a transport carrier having a recess and an electronic data carrier that is removably mounted in the recess. Exemplary embodiments provide for the recess to form an aperture opening. The electronic data carrier has an integrated circuit and an ability to fasten to an object. The surface of the electronic data carrier aligns with the surface of the transport carrier within a dimensional tolerance. The method includes providing a transport carrier, forming a recess in the transport carrier, and providing a flexible electronic data carrier having an adhesive layer. Exemplary embodiments provide for unrolling the electronic data carrier over the recess in such a way that the bottom side comes to rest close to the base of the recess and the visible surface points toward the passage of the recess. Exemplary embodiments provide for application of a cover over the recess after introduction of the electronic data carrier. Exemplary embodiments provide for an adhesive layer on the bottom side of the electronic data carrier. Exemplary embodiments provide for the electronic data carrier to be coupled to a transport underlay that separates from the electronic data carrier upon unrolling. Exemplary embodiments provide for an adhesive layer on the base of the recess in the transport carrier.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The above and/or other exemplary features and advantages of the preferred embodiments of the present invention will become more apparent through the detailed description of exemplary embodiments thereof with reference to the accompanying drawings, in which.

Throughout the drawings, like reference numbers and labels should be understood to refer to like elements, features, and structures.

DETAILED DESCRIPTION

Exemplary embodiments of the present invention will now be described more fully with reference to the accompanying drawings. The matters exemplified in this description are provided to assist in a comprehensive understanding of various embodiments of the present invention disclosed with reference to the accompanying figures. Accordingly, those of ordinary skill in the art will recognize that various changes and modifications of the embodiments described herein can be made without departing from the scope and spirit of the claimed invention. Descriptions of well-known functions and constructions are omitted for clarity and conciseness. To aid in clarity of description, the terms "upper," "lower," "above," "top," "bottom," "below," "left" and "right," as used herein, provide reference with respect to orientation of the accompanying drawings and are not intended to be limiting.

The present application is directed to a data carrier configuration. Exemplary embodiments provide for a data carrier configuration for accommodating a card, such as an Integrated Circuit (IC) card, having a recess and a chip card placed therein. The recess is generated in that an opening is introduced into the card and this opening is subsequently underlaid with a layer that adheres to the card, thereby closing the opening on one side of the card. This layer holds the chip card in the recess. The solution has the effect that bending and torsion forces are not transmitted from the carrier card onto the chip card. Application of the underlaid layer onto the rear side of the card, and insertion of the chip card in the recess, requires complex method steps, which tends to increase cost. Accordingly, exemplary embodiments of the present invention provide a data carrier configuration for accommodating a smaller electronic data carrier cost-effectively on a transport carrier, the entire data carrier configuration being able to be handled and processed like a data carrier in the format of the transport carrier.

Exemplary embodiments are based on the approach of employing a flexible electronic data carrier which, in order to couple it to the transport carrier, is unrolled in a recess provided in the transport carrier. It is thus possible to connect an adhesive underlay, which carries the electronic data carrier, and the electronic data carrier itself, to the transport carrier in one work step. The resulting data carrier configuration, according to exemplary embodiments of the present invention, has the advantage that electronic data carriers may be processed, such as, for example, personalized, in a machine which is designed for the processing of data carriers in the format of the transport carrier, such as, for example, CR80 card body format. Thus, smaller sized items, such as stickers, microSD cards, or any item requiring personalization, can be personalized using standard equipment without having to re-tool and incur additional costs for the smaller form factor. The data carrier configuration may be produced cost-effectively because only one opening is introduced into the transport carrier and the requirements for the precision thereof are not excessively high. The electronic data carriers may advantageously be provided on a roll, whereby the handling and connection to transport carriers may be simplified. The same transport carriers may also be used for electronic data carriers having different external dimensions. The data carrier configuration may also be relayed to end-users without further processing.

A second exemplary embodiment of the present invention supports processing of the data carrier configuration in a machine set up for data carriers in the format of the transport carrier, in that they close the gap between electronic data carrier and transport carrier substantially completely, but nonetheless offer the possibility of processing the surface of the electronic data carrier directly, for example, in order to visually personalize it.

Figures 1A, 1B, 2, 3, 4, 4A, 4B:
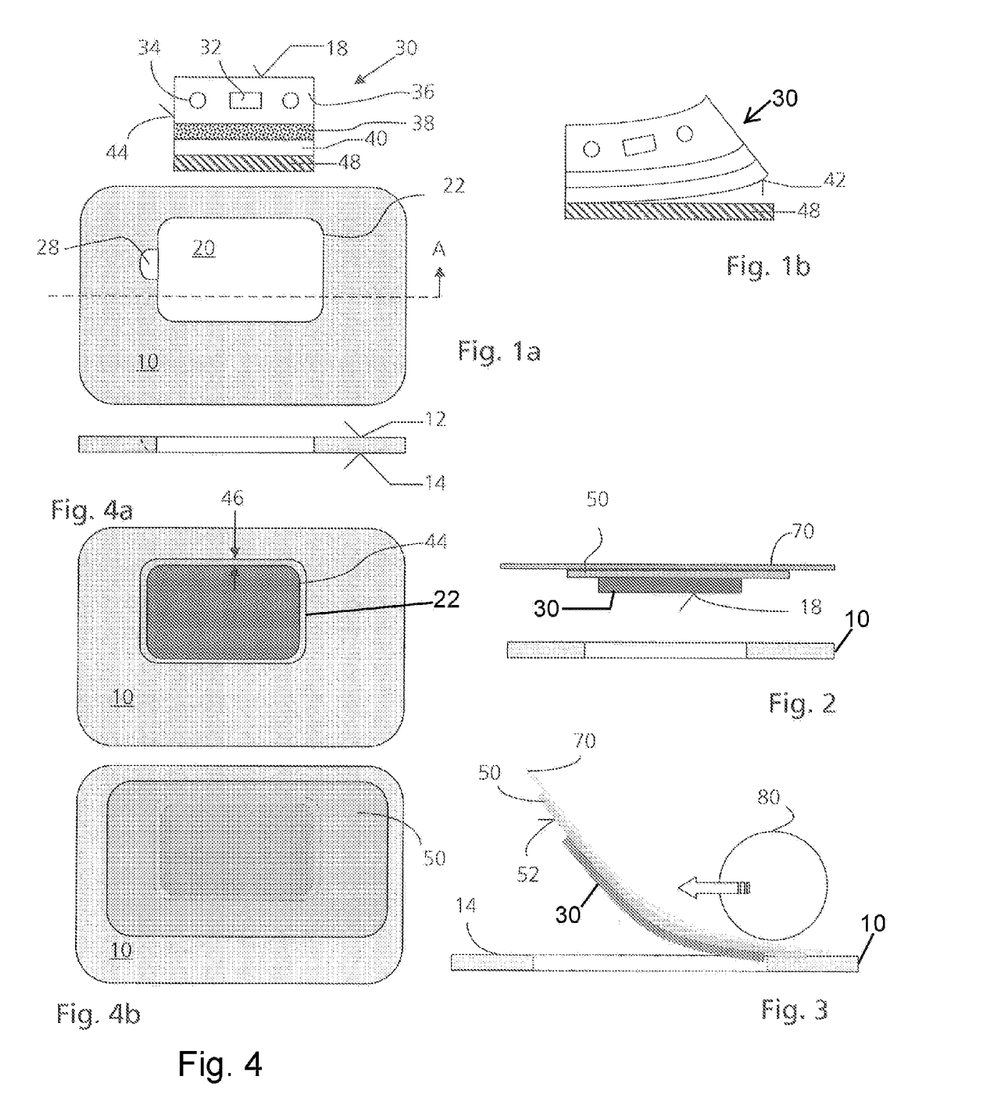
FIGS. 1a and 1b show a data carrier configuration in plan and cross-sectional views in accordance with an exemplary embodiment of the present invention.
FIG. 2 shows an electronic data carrier coupled to a transport film above a transport carrier in accordance with an exemplary embodiment of the present invention.
FIG. 3 shows the application of an electronic data carrier coupled to a transport film in accordance with an exemplary embodiment of the present invention.
FIGS. 4a and 4b show a data carrier configuration in top and bottom plan views in accordance with an exemplary embodiment of the present invention.

FIG. 1 shows a transport carrier 10 according to an exemplary embodiment of the present invention in a top view and in a cross-section along line A in which a recess 20 is introduced by punching, cutting, milling or any method known to those in the art. Exemplary embodiments provide for recess 20 to partially or, alternatively, completely penetrate transport carrier 10. As in all further figures, the dimensions and proportions shown were selected for purposes of better illustration and are not to be understood as limiting the invention or the manufacturing specifications. The transport carrier 10 is designed having a top surface 12 and a bottom surface 14. Exemplary embodiments comprise a rigid material that allows slight bends at bending angles of not greater than 45°, relative to center. In exemplary embodiments, the transport carrier 10 is formed as a card body in the ISO format (such as, for example, CR80), as is used for producing chip cards, and has the external dimensions and thickness thereof, but other embodiments provide for the transport carrier to be sized according to custom specification. In exemplary embodiments, the recess 20 is designed so that an electronic data carrier 30 fits therein, as is shown in FIG. 1 above the top view of the transport carrier 10 in cross-section, the size ratios shown are to be understood as not to scale. The external contour 44 of the electronic data carrier 30 has, as indicated in FIG. 1, a similar shape as the internal contour 22 of the recess 20. For example, the electronic data carrier 30 may have external dimensions that approximately correspond to a chip card. Without further measures, however, electronic data carrier 30 may also have a contour 44 of entirely different geometry than that of the chip card, which may deviate from the internal contour 22 of the recess 20. Thus, for example, an electronic data carrier 30 having rounded corners may be placed in a recess 20 having the shape of a rectangle.

The electronic data carrier 30 carries an integrated circuit 32 and an interface, which is connected thereto, for communication with a read and/or write unit to facilitate contactless implementation, which in one exemplary embodiment takes the form of an antenna. Other embodiments of the interface, however, also come into consideration, such as a contact-operated interface in the form of a contact panel situated toward the visible surface 18 of the electronic data carrier 30. As illustrated in the exemplary embodiment of FIG. 1b, the electronic data carrier 30, which in one exemplary embodiment is manufactured from a flexible material having a lower modulus of elasticity than the material used for the transport carrier 10. In this embodiment, the electronic data carrier 30 therefore allows significant bending at bending angles of 90° or more relative to center and may be situated readily even in a terminal position on a curved substrate or transport carrier. Exemplary embodiments provide for the electronic data carrier 30 to comprise a sticker or label having electronic components to enable near field communications (NFC), such as, for example, financial transactions. Exemplary embodiments provide for the height of the electronic data carrier 30 to correspond to the thickness of the transport carrier 10 or within a permissible deviation. For example, minor deviations, higher or lower, of the height of the electronic data carrier 30 relative to the thickness of the transport carrier 10 are permitted. Exemplary embodiments provide for the electronic data carrier 30 to be a contactless IC product implemented as a sticker or label, for example, which is attached to a mobile telephone in order to allow NFC transactions.

Electronic data carrier 30 comprises multiple layers—the integrated circuit 32, antenna 34, and optionally provided additional components situated in a first layer 36. A ferrite layer 38 can be provided below layer 36 (relative to visible surface 18), and underneath that an adhesive layer 40 that sticks to the bottom side 42. A removable protective layer 48 covers the self-adhesive layer 40. The protective layer 48 may in turn be implemented as an adhesive on its bottom side in one embodiment variant. The layer sequence shown is exemplary and not limiting as additional layers may be provided if desired. Alternatively, the protective layer 48 and the ferrite layer 38 may be dispensed with or implemented as a property of another layer.

Exemplary embodiments of the external contour 44 of electronic data carrier 30 correspond to the internal contour 22 of recess 20 in the transport carrier 10, but in the preferred embodiment is positioned within transport carrier 10 to leave a tolerance distance so that a residual gap 46 remains peripherally on one or more sides in the inserted state between the outer edge 44 of the electronic data carrier 30 and the inner edge 22 of the recess in transport carrier 10 (see FIG. 4a). Residual gap 46 facilitates placement of the electronic data carrier 30 in recess 20 and allows electronic data carriers 30 having different external contours 44 to be placed in the same type of transport carrier 10. A grip indentation 28 in the form of a notched segment, for example, can be implemented at a suitable point on the periphery of the internal contour 22 of recess 20. Grip indentation 28 supports engaging a finger below an electronic data carrier 30 mounted in recess 20.

The exemplary embodiment of FIG. 2 shows a section through a transport carrier 10 as shown in FIG. 1a in cross-section along line A, and above it a transport film 70, on which an underlay 50 is placed so it is removable and on which an electronic data carrier 30 is in turn placed so it is removable. The underlay 50 is preferably a film whose thickness is sufficiently low so that the processing of a transport carrier 10, which is applied on one side of underlay 50, in a processing machine, such as a personalization station, is not impaired. In the preferred embodiment underlay 50 is larger than the passage of recess 20 so that the underlay completely covers recess 20 in the connected state (see FIG. 4b).

In reference to the exemplary embodiment shown in FIG. 3, with side 52 facing toward transport carrier 10, the underlay 50 is provided with an adhesive layer to which the electronic data carrier 30 releasably adheres. In the configuration shown in the exemplary embodiment of FIG. 2, the electronic data carrier 30 is seated on the underlay 50 or on the transport film 70 so that its visible surface 18 points downward, that is, towards the base of recess 20. It is placed on the underlay 50 so that upon connection of the configuration, which comprises underlay 50, transport film 70 and the electronic data carrier 30, to the transport carrier 10, the electronic data carrier 30 comes to rest in recess 20 and the underlay 50 completely covers the passage of recess 20 (see FIG. 4b). Alternatively, the electronic data carrier 30 can be seated on the underlay 50 or on the transport film 70 so that its visible surface 18 points upward, that is, away from the base of recess 20.

Transport film 70 having the underlay 50 and the electronic data carrier 30 located thereon may be provided individually for each transport carrier 10. However, in the preferable embodiment the transport film is a strip provided on a roll on which a plurality of electronic data carriers 30 are situated in one or more rows.

In a preferred embodiment, for the introduction of the electronic data carrier 30 into recess 20 in transport carrier 10, the transport film 70 is unrolled above the bottom surface 14 of transport carrier 10. This procedure is illustrated in the exemplary embodiment of FIG. 3. The transport film 70 having the underlay 50 and the electronic data carrier 30 located thereon is oriented above the bottom side of transport carrier 10 so that, by the unrolling of the roll, and/or as indicated in FIG. 3 by the movement of a roller 80, the underlay 50 is first pressed on the bottom surface 14 of the transport carrier 10. A first inner edge of the electronic data carrier 30 is then pressed into recess 20, then the remaining portion of the electronic data carrier 30 is pressed into recess 20, and finally the protruding part of the underlay 50 facing away is pressed onto the surface of the transport film 70. Due to the adhesive layer applied to the transport film 70, the transport film 70 adheres in the areas adjacent to the recess 20 upon which it rests on the transport carrier 10. The transport film 70 is removed from underlay 50 during or after the application of the underlay 50 having the electronic data carrier 30 onto the transport carrier 10. The surface 52 of the underlay 50 pointing into the opening forms the base of recess 20 in the transport carrier 10. A configuration made of a transport carrier having a recess 20 into which an electronic data carrier 30 is inserted thus results.

The exemplary embodiment of the present invention shown in FIG. 4a shows a top/plan view of the top surface 12 of the transport carrier 10. The electronic data carrier 30 may be recognized from this side while leaving a peripheral gap 46 between the outer edge 44 of the electronic data carrier 30 and the inner edge 22 of recess 20. The exemplary embodiment of the present invention shown in FIG. 4b shows a plan view of the bottom surface 14 of the same transport carrier 10 in which only the underlay 50 transferred to the transport carrier 10 may be recognized, which in the exemplary embodiment of FIG. 4b is shown to completely cover the passage of recess 20.

The visible surface 18 of the electronic data carrier 30 is aligned in the inserted state with the top side of the transport carrier 10, and/or aligns therewith in a tolerance, so that the visible surface 18 of the electronic data carrier and the surface 12 of the transport carrier 10 form a homogeneous planar surface except for gap 46. The configuration comprising the transport carrier 10 and the electronic data carrier 30 inserted therein may be supplied for processing in a machine oriented to the format of the transport carrier 10, such as, for example, a personalization machine. The configuration may also be delivered to end users, who then separate the electronic data carrier 30 from the transport carrier 10.

The adhesion of the electronic data carrier 30 on the base of recess 20 is dimensioned so that the electronic data carrier 30 is readily removable from recess 20. In a preferred embodiment, removal is performed by an unrolling movement, the flexible electronic data carrier 30 first being raised at an edge and then bent out of the plane of transport carrier 10. The raising is facilitated by the grip indentation 28, if provided. Upon removal of the electronic data carrier 30 from recess 20, the protective layer 48 can separate from the base of recess 20. In an exemplary embodiment, the adhesion between the adhesive layer 40 of the electronic data carrier 30 and the protective layer 48 is greater than the adhesion between the protective layer 48 and the base 52 of underlay 50 over recess 20. Following separation from the transport carrier 10, a user may then remove the protective layer 48 from the adhesive layer 40 of the electronic data carrier 30. After removal, the electronic data carrier 30 may subsequently be fastened to an object by sticking on. In an alternate embodiment, the adhesion between the adhesive layer 40 of the electronic data carrier 30 and the protective layer 48 may be less than the adhesion between the protective layer 48 and the base 52 of recess 20 so that the protective layer 48 remains in the recess upon removal of the electronic data carrier 30 and exposes the adhesive layer 40 of electronic data carrier 30. The electronic data carrier 30 may then be fastened directly to an object, such as, for example, a mobile phone. In exemplary embodiments electronic data carrier 30 comprises a microSD card, miniSD card, or other product requiring personalization. In such embodiments, recess 20 is sized to accommodate placement of electronic data carrier 30 and the adhesion between the adhesive layer 40 of the electronic data carrier 30 and the protective layer 48 may be less than the adhesion between the protective layer 48 and the base 52 of recess 20 so that the protective layer 48 remains in the recess upon removal of the electronic data carrier 30.

Figure 5:
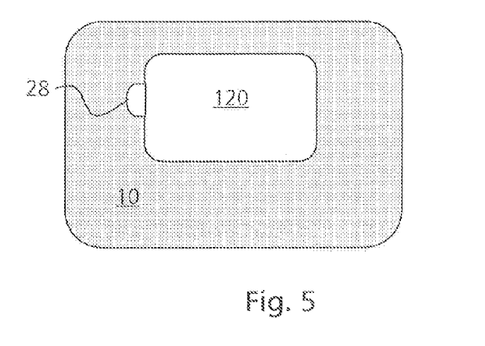
FIG. 5 shows a transport carrier in accordance with an exemplary embodiment of the present invention.

FIG. 5 illustrates another exemplary embodiment of the present invention. Recess 120 in transport carrier 10 is not achieved by applying an opening and subsequently closing it using an underlay 50, but rather is applied as an integral component of the transport carrier 10. That is, in this embodiment recess 120 does not penetrate completely through transport carrier 10. The application of the recess 120 may be performed, for example, in that firstly a card body is provided and the recess 120 is milled out therein, or, in an alternate embodiment, a card body having a recess 120 is injection molded using a mold, for example. The depth of the recess 120 and/or the thickness of an electronic data carrier inserted therein are dimensioned so that the visible surface 18 of an electronic data carrier 30 inserted into the recess and the top side 12 of the transport carrier 10 align with one another within the scope of a predetermined dimensional tolerance. In an exemplary embodiment recess 120 is formed by laminating two layers wherein one layer is continuous and the other layer has an aperture. In another embodiment the two layers are continuous and separated by a separation layer at least in the area where the recess is to be subsequently located. To form the recess the area above the separation layer is punched out or removed in a manner known to those in the art.

Figure 6:
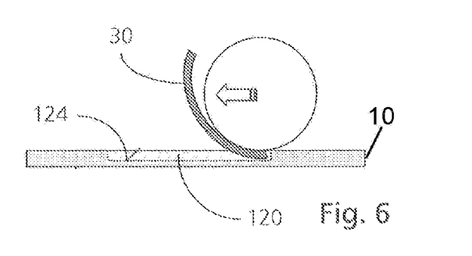
FIG. 6 shows application of an electronic data carrier to a transport carrier in accordance with an exemplary embodiment of the present invention.

In the exemplary embodiment shown in FIG. 6, electronic data carrier 30 is provided on a roll 80 or introduced into the recess 120 with the aid of a roller. The electronic data carrier 30 is fundamentally unrolled into the recess 120 in the same way as described in the exemplary embodiment of FIG. 3 so that it detaches from the employed roll 80 and/or transport underlay 50. In an alternate embodiment underlay 50 is not used. In an alternate embodiment, base 124 of recess 120 is provided with a lightly adhering adhesive or adhesive layer, so that electronic data carrier 30 adheres thereon. Alternatively, protective layer 40 (see FIG. 1a) of electronic data carrier 30 may be provided with an adhesive layer toward base 124 of recess 120 so that the electronic data carrier 30 adheres in recess 120. An adhesive layer is optional in any case, however.

Figure 7:
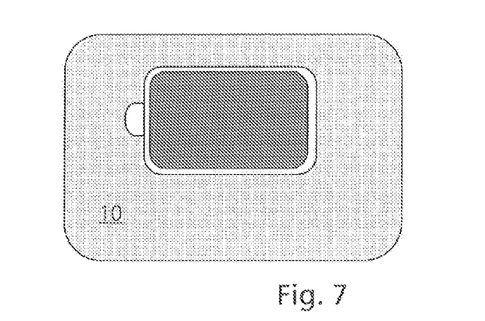
FIG. 7 shows a data carrier configuration in accordance with an exemplary embodiment of the present invention.

The exemplary embodiment of the present invention illustrated in FIG. 7 shows the data carrier configuration resulting after introduction of the electronic data carrier 30 into recess 120 in a top view of the top side or the visible surface 18 of the electronic data carrier 30. The electronic data carrier 30 is seated in recess 120 while leaving a peripheral marginal gap 46, the visible surface 18 of the electronic data carrier and the top side 12 of the transport carrier 10 substantially aligning with one another within a dimensional tolerance.

Figure 8:
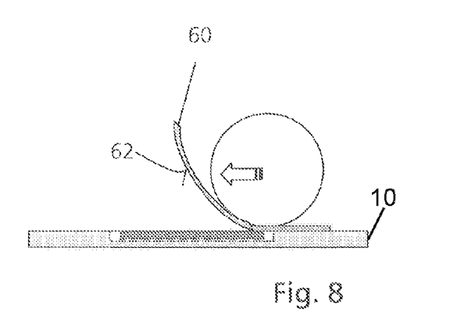
FIG. 8 shows application of cover to a data carrier configuration in accordance with an exemplary embodiment of the present invention.

In the exemplary embodiment shown in FIG. 8, a cover 60 is applied on the configuration. In the exemplary embodiment of FIG. 8, cover 60 is provided in the form of a film and unrolled over the data carrier configuration. Cover 60 may be self-adhesive. For this purpose, cover 60 is provided toward the top side 12 of the transport carrier 10 and/or toward the visible surface 18 of the electronic data carrier 30 with an adhesive layer 62 whose adhesive force is determined so that the cover 60 may readily be pulled off later by a user. In exemplary embodiments cover 60 is larger than the passage of recess 120 and holds the electronic data carrier 30 in recess 120, which can help to provide secure transport, such as, for example, through the mail service.

Figure 9:
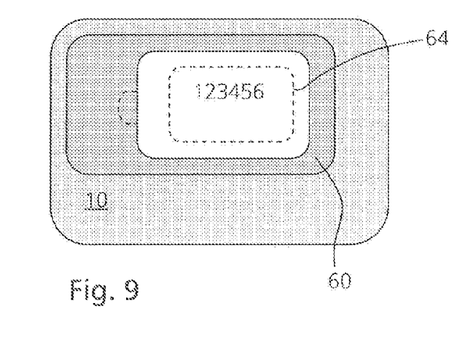
FIG. 9 shows a data carrier configuration in accordance with an exemplary embodiment of the present invention.

In the exemplary embodiment shown in FIG. 9, cover 60 is provided with an aperture so that it covers the marginal area of the electronic data carrier 30, gap 46, and an area on the top side 12 of the transport carrier 10, which encloses the recess passage, but because of the aperture the inner area of the surface of the electronic data carrier remains exposed via the aperature of cover 60. The surface 12 of the electronic data carrier 30 may be reached and processed directly through the exposed aperture 64. For example, alphanumeric characters may be applied to visible surface 18 through aperture 64 in a personalization facility by, for example, printing or lasers. The application of cover 60 may also be performed together with the introduction of the data carrier 30 into recess 120 in a single step. Cover 60 and electronic data carrier 30 can be provided jointly for this purpose on a correspondingly prepared sheet.

The data carrier configuration shown in the exemplary embodiment of FIG. 9, as with other embodiments, may be supplied for processing in a machine oriented to the format of the transport carrier 10 and may also be transferred to an end user without further alteration. In order to be able to use the electronic data carrier 30, an end user removes cover 60 from the transport carrier 10 and then separates electronic data carrier 30 from cover 60. Alternatively, the user may remove cover 60 and then remove the electronic data carrier 30 from transport carrier 10. In an exemplary embodiment, the adhesion between the protective layer 48 (see FIG. 1a) and cover 60 is configured to be less than the adhesion between the protective layer 48 and the adhesive layer 40 (see FIG. 1a) of the electronic data carrier 30. In a finishing step, an end user removes the protective layer 48 from the adhesive layer 40 on the electronic data carrier 30, which may then be fastened to an object, such as, for example, a mobile phone. In an alternate embodiment, the adhesion between protective layer 48 and cover 60 may be configured to be greater than the adhesion between the protective layer 48 and the adhesive layer 40 so that after the separation of the electronic data carrier 30 from the cover 60, adhesive layer 40 is exposed and the electronic data carrier 30 may be fastened directly to an object.

Figure 10:
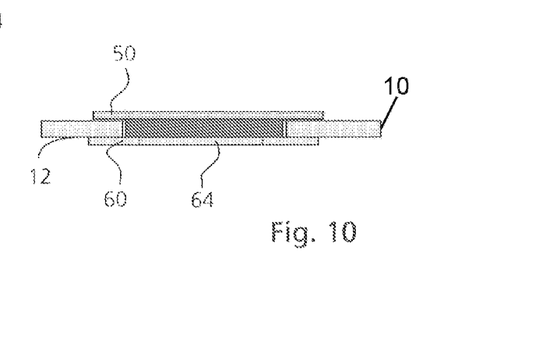
FIG. 10 shows a data carrier configuration in accordance with an exemplary embodiment of the present invention.

FIG. 10 illustrates an exemplary embodiment in which two exemplary embodiments discussed previously may be partially combined. In the exemplary embodiment of FIG. 10, a cover 60 may be used for a data carrier configuration as shown in FIG. 4. Cover 60 can be applied to the front side 12 of the transport carrier 10, preferably by rolls, so that the residual gap 46 between electronic data carrier 30 and opening 20 is substantially closed. Direct processing of the visible surface 18 of the electronic data carrier 30 may be performed through a aperture 64, in order to provide access to said electronic data carrier to visually personalize it, for example. In an alternate embodiment, the adhesion between cover 60 and visible surface 18 may be set according to the wishes of the producer of the data carrier configuration so that the electronic data carrier adheres either to underlay 50 or to the cover 60 upon removal from transport carrier 10.

Figures 11, 11A, 11B:
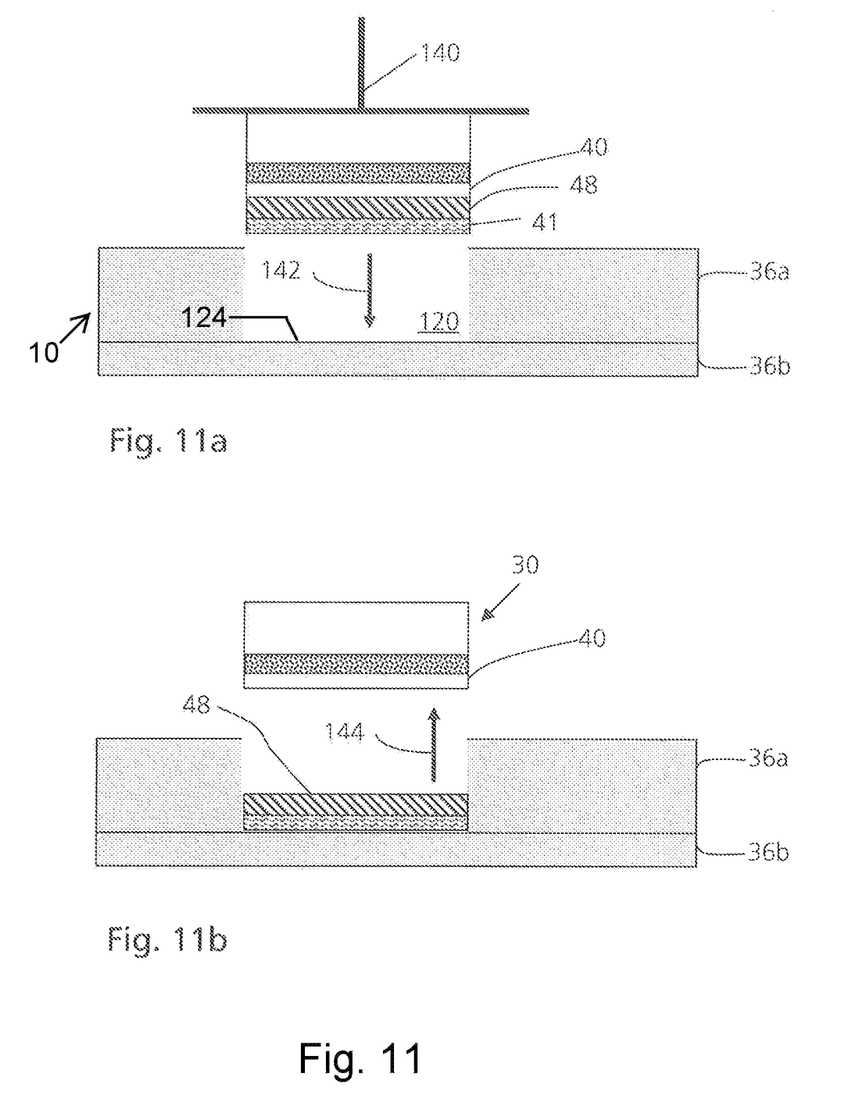
FIGS. 11a and 11b show a variant to the insertion of an electronic medium in a carrier in accordance with an exemplary embodiment of the present invention.

In an alternate embodiment illustrated in FIG. 11a, electronic data carrier 30 can be applied via manipulator 140 with a linear movement into recess 120 of transport carrier 10, as indicated by the top-down vertical direction of arrow 142. In other embodiments electronic data carrier 30 can initially be placed on edge and then rolled into recess 120 by a tilting position transferring to a rolling motion. In the preferred embodiment the recess is of the type illustrated by FIG. 6. In the alternate embodiment illustrated in FIG. 11a, transport carrier 10 comprises a two-layer structure with two sub-layers 36a and 36b. Sub-layer 36b comprises a fine continuous layer and sub-layer 36a is thicker in comparison. Sub-layer 36a forms an aperture so that in a combined state sub-layers 36a and 36b form recess 120. In exemplary embodiments the thickness of electronic data carrier 30 is slightly larger than the depth of recess 120 so as to slightly protrude above transport carrier 10, which thereby facilitates separation of electronic data carrier 30 from transport carrier 10.

In an exemplary embodiment illustrated in FIG. 11, electronic data carrier 30 has a layer structure (as shown in FIG. 1) whereby under protective layer 48 is an additional second self-adhesive layer 41. The adhesion of second self-adhesive layer 41 is stronger than the adhesion of first self-adhesive layer 40 so that the adhesive bond between protective layer 48 and base 124 of recess 120 is stronger than the adhesive bond between protective layer 48 and first self-adhesive layer 40. This difference in adhesive bond facilitates removal of electronic data carrier 30 from recess 120 as shown in FIG. 11b with arrow 144 indicating direction of removal. After removal of electronic data carrier 30, protective layer 48 remains in recess 120 and electronic data carrier 30 can be attached to an object via exposed first self-adhesive layer 40.

While the present invention has been particularly shown and described with reference to certain exemplary embodiments thereof, it will be understood by those of ordinary skill in the art that various changes in form and detail may be made therein without departing from the spirit and scope of the present invention as defined by the appended claims.

What is claimed is:

1. A data carrier configuration, comprising:
an electronic data carrier having a first modulus of elasticity; and
a transport carrier having a second modulus of elasticity that is greater than the first modulus of elasticity, the transport carrier having a top surface and forming a recess, the area of said recess having an opening area of a length and width sized to accommodate said electronic data carrier and having a depth substantially equal to the thickness of said electronic data carrier, the transport carrier providing a base upon which said electronic data carrier is configured to releasably attach,
wherein said transport carrier comprises a grip indentation formed therein at a position on a periphery of said recess,
wherein said grip indentation is a notched segment in the transport carrier that extends from the top surface of the transport carrier for a distance less than the thickness of said electronic data carrier, and
wherein said grip indentation is configured to receive a removal object therein and to provide the removal object with access to a space between said base and a bottom surface of said electronic data carrier when said electronic data carrier is bent.

2. The data carrier configuration of claim 1, wherein said electronic data carrier is sufficiently accessible through said recess to receive personalization data.

3. The data carrier configuration of claim 1, wherein said transport carrier is formed as a card body in a format specified by an international standards organization.

4. The data carrier configuration of claim 3, wherein said format comprises CR80.

5. The data carrier configuration of claim 1, wherein said electronic data carrier comprises a microSD card.

6. The data carrier configuration of claim 1, wherein said electronic data carrier comprises a sticker having electronic components to facilitate near field communications.

7. The data carrier configuration of claim 1, wherein said transport carrier is formed of a material having a rigidity enabling said transport carrier to have a maximum bend angle of 45 degrees relative to center.

8. The data carrier configuration of claim 1, further comprising a cover that is releasably attached to said transport carrier and having an external area larger than the opening area of said recess.

9. The data carrier configuration of claim 8, wherein said cover forms an aperture having an opening through which said electronic data carrier may be accessed to receive personalization data.

10. A data carrier configuration, comprising:
an electronic data carrier having a first modulus of elasticity;

a transport carrier having a second modulus of elasticity that is greater than the first modulus of elasticity, the transport carrier having a top surface and bottom surface and forming an aperture having an opening area of a length and width sized to accommodate said electronic data carrier and having a depth substantially equal to the thickness of said electronic data carrier; and an underlay coupled to the bottom surface of said transport carrier, enclosing said aperture and thereby forming a recess, the underlay providing a base upon which said electronic data carrier is configured to releasably attach, wherein said transport carrier comprises a grip indentation formed therein at a position on a periphery of said recess, wherein said grip indentation is a notched segment in the transport carrier that extends from the top surface of the transport carrier for a distance less than the depth of said aperture, and wherein said grip indentation is configured to receive a removal object therein and to provide the removal object with access to a space between said base and a bottom surface of said electronic data carrier when said electronic data carrier is bent.

11. The data carrier configuration of claim 10, wherein said underlay is releasably coupled to the bottom surface of said transport carrier.

12. The data carrier configuration of claim 10, wherein said underlay is formed of a material enabling said underlay to be flexible.

13. The data carrier configuration of claim 10, further comprising a cover that is releasably attached to the top surface of said transport carrier and having an external area larger than the opening area of said recess.

14. The data carrier configuration of claim 13, wherein said cover forms an aperture having an opening through which said electronic data carrier may be accessed to receive personalization data.

15. A method of making a data carrier configuration, comprising:

forming a recess in a transport carrier having a top surface, the area of said recess having an opening area of a length and width sized to accommodate an electronic data carrier and a depth substantially equal to the thickness of said electronic data carrier, a region of said transport carrier accessible through said opening area providing a base, said electronic data carrier having a first modulus of elasticity, and said transport carrier having a second modulus of elasticity that is greater than the first modulus of elasticity;

forming a grip indentation in said transport carrier at a position on a periphery of said recess, said grip indentation being formed as a notched segment in the transport carrier that extends from the top surface of the transport carrier for a distance less than the thickness of said electronic data carrier, and said grip indentation being configured to receive a removal object therein and to provide the removal object with access to a space between said base and a bottom surface of said electronic data carrier when said electronic data carrier is bent;

releasably attaching said electronic data carrier to a transport film;

rolling said electronic data carrier into position within said recess; and releasably attaching said electronic data carrier to the base of said transport carrier.

16. A method of making a data carrier configuration, comprising:

forming an aperture in a transport carrier having a top surface and bottom surface, the aperture having an opening area of a length and width sized to accommodate an electronic data carrier and a depth substantially equal to the thickness of said electronic data carrier, said electronic data carrier having a first modulus of elasticity, and said transport carrier having a second modulus of elasticity that is greater than the first modulus of elasticity;

coupling an underlay to the bottom surface of said transport carrier, said underlay enclosing said aperture and thereby forming a recess with an opening through the top surface of said transport carrier, and a region of said underlay accessible through said opening area providing a base;

forming a grip indentation in said transport carrier at a position on a periphery of said recess, said grip indentation being formed as a notched segment in the transport carrier that extends from the top surface of the transport carrier for a distance less than the depth of said aperture, and said grip indentation being configured to receive a removal object therein and to provide the removal object with access to a space between said base and a bottom surface of said electronic data carrier when said electronic data carrier is bent;

releasably attaching said electronic data carrier to a transport film;

rolling said electronic data carrier into position within said recess; and releasably attaching said electronic data carrier to the base of said underlay.

17. The data carrier configuration of claim 1,
wherein said electronic data carrier comprises:
a first adhesive layer; and
a protective layer covering said first adhesive layer,
wherein said base of said transport carrier comprises a second adhesive layer configured to adhere to said protective layer of said electronic data carrier, and
wherein said protective layer is configured to separate from said first adhesive layer when said electronic data carrier is separated from said base of said transport carrier.

18. The data carrier configuration of claim 1,
wherein said electronic data carrier comprises:
a first adhesive layer; and
a protective layer covering said first adhesive layer,
wherein said base of said transport carrier comprises a second adhesive layer configured to adhere to said protective layer of said electronic data carrier, and
wherein said protective layer is configured to remain attached to said first adhesive layer when said electronic data carrier is separated from said base of said transport carrier.

19. The data carrier configuration of claim 10,
wherein said electronic data carrier comprises:
a first adhesive layer; and
a protective layer covering said first adhesive layer,
wherein said base of said underlay comprises a second adhesive layer configured to adhere to said protective layer of said electronic data carrier, and
wherein said protective layer is configured to separate from said first adhesive layer when said electronic data carrier is separated from said base of said underlay.

* * * * *